July 31, 1962   F. H. IDE ET AL   3,046,718
SUCTION CLEANER
Filed April 8, 1959   2 Sheets-Sheet 1
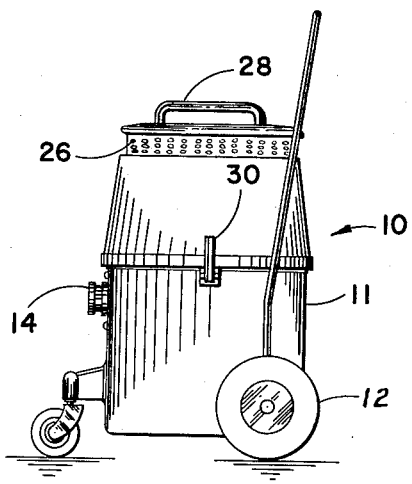
FIG. I
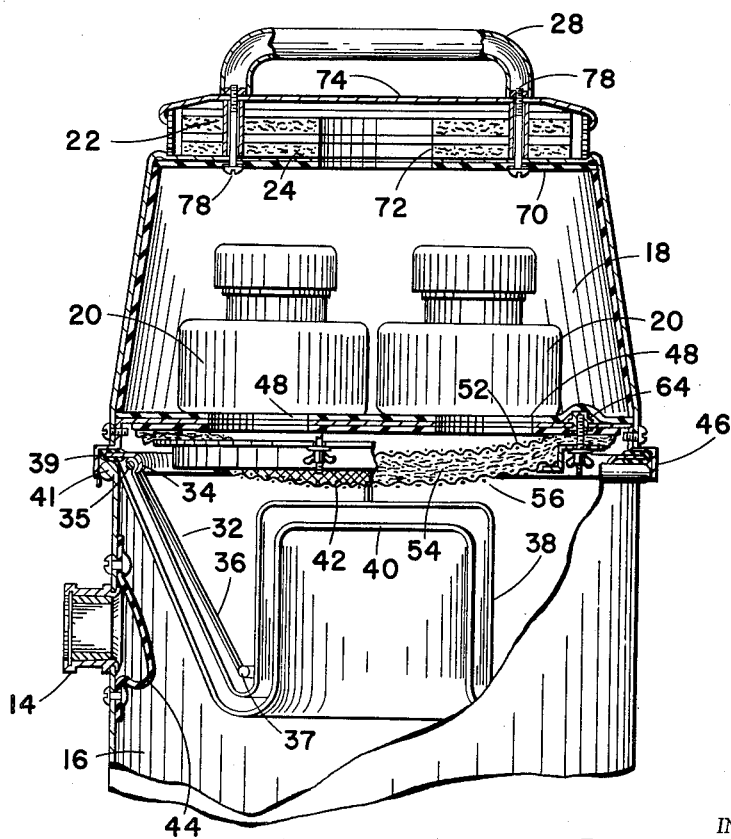
FIG. II
INVENTORS
FREDERICK H. IDE
ROBERT C. KIMBALL
BY
Robert O. Wright
ATTORNEY July 31, 1962    F. H. IDE ET AL    3,046,718
SUCTION CLEANER
Filed April 8, 1959    2 Sheets-Sheet 2
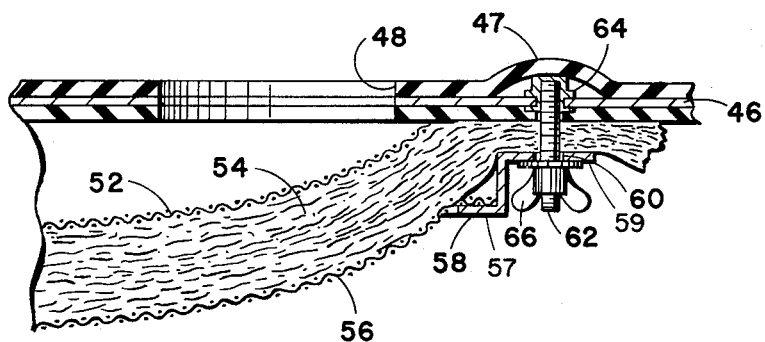
FIG. III
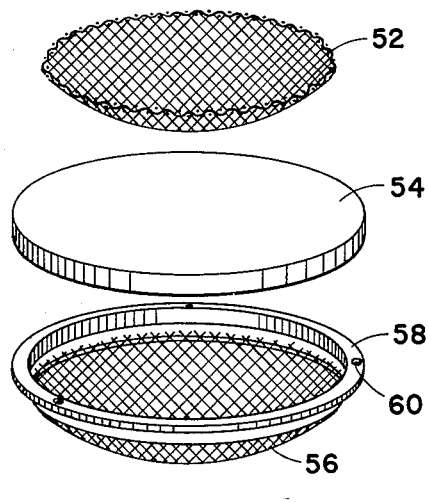
FIG. IV
INVENTORS
FREDERICK H. IDE
ROBERT C. KIMBALL
BY
*Robert O. Wright*
ATTORNEY ns Patent Office
3,046,718
Patented July 31, 1962

1

3,046,718
SUCTION CLEANER
Frederick H. Ide and Robert C. Kimball, Rome, N.Y., assignors to The Kent Company, Inc., Rome, N.Y.
Filed Apr. 8, 1959, Ser. No. 805,050
3 Claims. (Cl. 55—323)

This invention relates to an apparatus for removing minute undesired particles from a stream of air. More particularly this invention relates to self-contained suction-blower systems in which air is passed through various filter media at a relatively high velocity.

Heretofore various machines and methods have been utilized for removing minute particles from streams of air, generally by providing porous filter materials having small apertures therein so as to actually strain or sieve the particles from the air. This has always resulted in something less than one hundred percent arrestance of the undesired particles or else extremely low impractical air flow rates. According to the present invention we have discovered a method and apparatus utilizing a combination of porosity and inertial impaction principles to remove over 99.5 percent of all particles of three-tenths of a micron or larger size from a high volume, high velocity air stream.

Accordingly, it is a primary object of the present invention to provide an apparatus for removing minute particles from a stream of air. It is another object of the present invention to provide an apparatus for removing particles of three-tenths of a micron diameter and larger from a high velocity, high volume stream of air. It is another object of the present invention to provide an apparatus for efficiently picking up large quantities of dirt in a stream of air and removing substantially all particles therefrom and returning said air in a quiet, non-turbulent form to the space from which it was originally taken. It is another object of the present invention to provide a self-contained vacuum cleaner for use in hospitals and like institutions that will quietly and efficiently pick up dirt without discharging bacteria or other undesired matter back into the air of the cleaned room. It is a further object of the present invention to provide a multiple filter vacuum cleaning machine for removing dirt and bacteria from the stream of air entering therein and returning said air to the atmosphere in a quiet, non-turbulent condition. It is a further object of the present invention to provide a vacuum cleaning machine for picking up dirt from the floor and other surfaces by a stream of air, filtering said dirt and bacteria therefrom, and discharging said air from the machine without disturbing dust and dirt that has not been picked up from the floor or other surface. It is a further object of the present invention to provide an apparatus for removing bacteria from the air utilized in a vacuum cleaning system. It is a still further object of the present invention to provide a vacuum cleaning machine of improved design and efficiency that is economical and simple to use. These and other and further objects will be in part apparent and in part pointed out as the specification proceeds.

In the drawings:

FIGURE I is a side elevational view of a vacuum cleaning machine according to the present invention;

FIGURE II is an enlarged partial sectional view of the machine of FIGURE I;

FIGURE III is an enlarged partial sectional view of one of the filter means of the machine of FIGURES I and II; and FIGURE IV is an exploded perspective view of the filter means of FIGURE III.

Referring now to the drawings, the vacuum cleaning machine 10 according to the present invention comprises an outer container or housing 11 mounted on wheels 12 which illustratively include two large rear wheels and a small front caster wheel, so that it may be readily moved about in the cleaning operation. A suitable inlet 14 is provided on the lower portion of the housing 11, for connection to any of the well known types of flexible hoses and cleaning wands. Inlet 14 opens into the lower compartment 16 of the housing 11 which serves as a filter housing and dirt tank. The upper compartment 18 which serves as the suction portion of the housing 11 has mounted therein two fan and motor assemblies 20 which are adapted to draw air through the inlet 14 into the lower compartment 16, upper compartment 18 and then discharge it out through an exhaust assembly 22 which includes a muffler member 24 and exhaust ports 26 disposed about the periphery of the top portion of the container or housing 11. A suitable handle 28 is provided at the upper portion of the housing 11 for convenient removal of the top compartment from the dirt tank. A pair of clamps 30 are provided to adjustably secure the upper and lower portions of the housing 11 together in a fashion as shown in FIGURES I and II.

Positioned within the lower compartment 16 is an annular truncated cone frame member 32 which carries thereabout a pair of filter members 38 and 40. A third filter assembly 42 is positioned at the junction between the upper and lower compartments of the housing 11 to further filter the air. A suitable baffle or deflector 44 is provided adjacent the inlet 14 as will be described in detail herein.

The bottom portion of the housing 11 acts as a container for dust picked up by the machine. The lower chamber 16 is sealed from the upper chamber 18 by a partition plate 46 which carries thereon the filter 42 and the blower-motor assemblies 20. Both sides of plate 46 and the interior surfaces of chamber 18 are lined with a suitable foam rubber sealing and sound-deadening material 47, FIGURES II and III to effectively seal the chamber from the lower chamber 16 and to reduce the transmission of noise and vibration from the blower fans 20 to the exterior of the machine. A pair of openings 48 are cut in the plate 46 in registry with the inlets of the fans 20 to permit passage of air therethrough from the compartment 16. The filter 42, as may be seen in FIGURE II, is mounted on the plate 46 about the openings 48 so that any air that enters therethrough must first pass through the filter assembly 42. Filter 42 together with the bottom layer of material 47 on plate 46 effectively soundproof the upstream side of the cleaner and the material 47 and muffler 24 do the same for the downstream side.

Frame 32 comprises a ring which has a horizontal flange 34 adapted to fit over the top lip of the lower compartment 16 and a downwardly extending vertical flange 35 which carries thereon three or four or more rods 36 which in turn are fastened to a lower ring 37. A double gasket 39 is carried by flange 34 to form an airtight seal between the upper and lower compartments upon assembly. Filter 38 comprises a generally elongated bag of cloth or other suitable material and is fixed to flange 35 by suitable fastening members. Frame 32 acts as a support for filter 38 to ensure utilization of substantially all the surface thereof.

A disposable filter 40 is mounted in compartment 16 and comprises a bag somewhat similar in shape to filter 38 having an elastic band fixed in the open end thereof. Filter 40 is fixed in compartment 16 by placing the open end and elastic band outside the compartment about flange 41 on the lip thereof. This not only secures the filter 40 in chamber 16 about frame 32 but also permits ready disposal of the dirt in the lower portion of the housing 10 by merely removing the top and the filter frame assembly 32 and then inverting the compartment 16 which dumps the dirt into the filter 40, the bag may then be removed from the lip 41, closed and disposed of without further handling of the dirt.

The filter 40 is generally of a latex impregnated paper construction having an area of about eight hundred square inches. The filter 38 is usually of a heavy cloth flannel having an area of approximately six hundred square inches.

Referring further to FIGURES III and IV, the filter assembly 42 consists of an inner screen 52, filter material 54 and outer screen 56. Screen 52 is slightly dished and acts as a support for the filter material 54, holding it away from plate 46 and the openings 48 to provide a greater filtering area thereabout. Mounted over the inner screen 52 is a layer of filtering material 54 which may be of any suitable material such as glass or other fiber material impregnated with a suitable binder resin. Positioned about the filter material 54 and the screen 52 is an outer screen 56 which acts as a support and protection for the filter material 54 and which is fixed to an annular ring 58 about the periphery thereof. The annular ring 58 carries screen 56 on an outer flange 57 which is joined to a wider inner flange 59 by an intermediate web portion. Flange 59 has three holes 60 drilled at spaced intervals therein. These holes 60 are positioned to correspond to studs 62 which are secured in caps 64 fixed in plate 46. The caps 64 are secured in plate 46 in an air-tight manner and have an integral cap thereon so there is no possibility of air escaping from compartment 16 into 18 through these bolts rather than through the filter material 54. Obviously the number of studs 62 and holes 60 may be varied to the particular filter configuration.

It will also be noticed that the filter material 54 extends outwardly beyond the ring 58 and flange 59. When hand-tightened nuts such as wing nuts 66 are tightened down the flange 59 acts to compress the filter material between it and the layer of gasket material 47 on the underside of plate 46 to provide a very effective seal around the edge of the filter assembly 42. Hence, the only access to compartment 18 is through filter 42. Any air that may seep in between the ring 58 and plate 46 will be filtered very thoroughly by the compressed and compacted filtering material 54.

The upper part of the chamber 18 is formed into a plate 70, FIGURE II which has cut therein an opening 72 and carries on top thereof a muffler assembly as shown and described in Letters Patent No. 2,719,596 to M. A. Kent et al. This muffler assembly is housed within an outer shell 74 which is held fixed to the plate 70 by the handle 28 and bolts 78. The muffler assembly, as described in the aforesaid patent, disperses the air and absorbs the sound and tends to discharge it in a smoothly flowing stream rather than a turbulent mass. This action is further aided by a plurality of small holes 26 in the sides of cover 74 cut at close intervals throughout the entire circumference thereof. The apertures 26 are directed in an outward direction so as to discharge the air from the machine in at least a horizontal, if not a slightly upward, direction so that there are no undesired air currents created on the floor to stir up dust, etc., therefrom.

A suitable electric connection is, of course, provided for the blower and motor assemblies 20 but this has been omitted for the sake of clarity.

In operation a conventional flexible hose and dirt pickup wand are connected to the inlet 14. Air and dirt are drawn through inlet 14 into the chamber 16 by the suction created by the motor-blower assemblies 20. As the air enters the inlet 14 it is diverted sharply by the baffle 44 into a generally circular direction about the container 16. This causes any heavy foreign objects such as stones, pins, and the like to drop to the bottom of the container due to the centrifugal action and allows only the lighter particles of dirt to be carried by the air stream to the rest of the filtering mechanism. The filters 38 and 40 are pulled into the configuration shown in FIGURE II by the suction and provide a very large surface area for the passage of air therethrough. Substantially all of the larger particles of dust and dirt are removed by the filters 38 and 40 and the air then passes through them to the filter assembly 42. Here the multiple layers of the filtering material 54 remove the remaining dust particles, if any, plus other minute particles such as bacteria.

In the illustrative embodiment shown, the air, after it passes through the filter assembly 42, passes through the blower-motor assemblies 20 to cool same and is then passed through the opening 72 to the muffler assembly 22 and thence through the discharge openings 26 back to the atmosphere. The gradually expanding discharge ports of the muffler 24 slow the velocity of the discharging air and thus quiet it somewhat and also absorb the sound therefrom so that the air discharge from the machine is accomplished in a quiet, smooth fashion. The action of the apertures 26 causes the air to be discharged in at least a horizontal if not a somewhat upwardly diverging direction such that no undesired drafts or air currents are created at the floor or other surface upon which the vacuum cleaner rests to stir up dust which has settled out of the air by gravity and is to be picked up by the machine in the cleaning operation. The air, by the time it reaches the atmosphere again, has had substantially all the bacteria and other particles therein removed during its transit through the machine so that it can be said that not only has the room been cleaned but the air has been purified. Also, by the novel muffler and filter arrangement, a very quiet operating machine is obtained.

In the foregoing description of the structure, little has been expressly said of the method of the present invention. In the art of filtration there are a number of methods of removing minute particles from fluid such as an air stream. We have discovered by using three of these methods in sequence a very satisfactory solution to the problem of industrial and institutional vacuum cleaning is obtained. The three methods and the order in which we use them are: Cyclonic or centrifuge action to remove heavy and bulky objects that would damage a finer filter; porosity or straining filtration in which we use a filter with a definite hole or pore size which filters out on the surface thereof all particles of larger size (but permits anything smaller to pass through); and inertial impaction wherein a large number of fine fibers are arranged in random fashion in the air stream. Particles in the air tend to travel in a straight line and cannot dodge, hence, by the law of statistical probability, if enough fibers are used, the particles will collide with one or more fibers and be impaled thereon and thus removed from the air stream. For a more detailed description of impaction filtration, reference may be had to a publication entitled Studies of the Mechanisms of Bacterial Filtration From Air Streams by Arthur Humphrey, Special Publication No. 2 from the Biochemical and Food Engineering Program, Department of Chemical Engineering, Columbia University, New York 27, N.Y., April 30, 1952. This publication states in a section entitled Mechanisms of Filter Action that "Bacteria are removed from an air stream by impacting on the filter fibers . . . ," and further that "The bacteria may impact by one or more of several mechanisms. These are: (1) direct interceptions, (2) inertial impactions, (3) settling, (4) diffusion, (5) electrostatic attraction, (6) turbulence, and (7) thermal diffusion forces. A discussion of each mechanism follows in the order named." The publication then defines inertial impaction as follows: "Inertial Impaction. A bacterial or aerosol particle carried along by an air stream will, on approaching a fiber, tend to follow the stream; but, because of the inertia it possesses, it may continue in its original direction and impact with the collection fiber. This effect will increase with increasing particle mass and increasing air stream velocities." In this connection, it should be pointed out that in the glass fiber filters referred to herein, it is quite probable that some of the bacteria may impact by direct interception rather than by inertial impaction although the latter term is believed to be sufficiently accurate for the purpose of designating the impaction type of filtration referred to herein.

Baffle 44 provides the cyclonic action together with the cylindrical housing 11. Filters 38 and 40 are of the porosity type and have apertures of three microns and one-half to one micron respectively. Filters 38 and 40 for all practical purposes arrest all the dirt and dust particles in the air stream. A small amount of free atmospheric dust will penetrate filters 38 and 40 along with a substantial number of bacteria. Filter assembly 42 is of the inertial impaction type and in one illustrative form consists of from one to four layers of nominal half-inch thick glass fiber blankets impregnated with a suitable resin binder which is employed solely as a means for holding the glass fibers in blanket form. The fibers average 1.25 microns in diameter and a single layer will stop 99.78 percent of dry .3 of a micron size particles.

Bacteria range in size from .1 to 14 microns with the mean range between .3 and .7 micron. It has been found that even the smallest bacteria will be impacted on the filter material 54 and stick thereto by an action which is not clearly understood but is thought to be related to gravitation, adhesion and/or electrostatic charge. Thus even though the interstices between fibers are greater than the particle size, the laws of statistical probability cause the removal of substantially one hundred percent of the particles of .3 micron size and larger and most of the small bacteria.

There is thus provided a very suitable and satisfactory cleaning machine for use in institutions such as hospitals and the like where it is important that the cleaning mechanism not only picks up the dirt but also does not redistribute undesired bacteria or dirt particles back into the air to contaminate same and that it does not disturb the occupants.

While we have shown a particular combination of filters and a single layer of filter material 54 it should be understood that one or more layers of filter material 54 may be used, filters 38 and 40 can be varied or possibly omitted and instead of the baffle 44 some other means could be used to remove the very large particles from the air stream. Also while we have described a particular theory of operation of the multiple filter assembly, it should be understood that there may be more suitable explanations for the action therefor.

Further it has been found that in certain types of machines where they are operated "wet" i.e. actually pick up water with the dirt contained therein, the filters 38 and 40 may be replaced by a secondary cyclonic type filter element. In this type of operation the cyclonic action removes all the wet dirt and filter assembly 42 removes the bacteria.

As an illustrative example of the efficiencies obtained with a device of this type, it can be said that in at least certain operations the first filter 40 might remove better than fifty-five percent of all .3 micron size particles passed therethrough and perhaps ninety nine percent of all particles of several micron diameter size and larger. The second filter 38 would remove an additional ten to fifteen percent of all particles passing therethrough. The first layer of the third filter material 54 would remove 99.78 percent of all particles passing therethrough, the second layer a similar 99.78 percent of the particles reaching it, etc., so that the total penetration will be less than one-tenth of one percent since each successive filter removes its given percentage of the particles reaching it, not of the original particles contained in the air stream.

While there is given above a certain specific example of this invention and its application in practical use, it should be understood that this is not intended to be exhaustive or to be limiting of the invention. On the contrary, this illustration and explanation herein are given in order to acquaint others skilled in the art with this invention and the principles thereof and a suitable manner of its application in practical use so that others skilled in the art may be enabled to modify the invention and to adapt and apply it in numerous forms each as may be best suited to the requirement of a particular use.

We claim:

1. In a vacuum cleaning machine for hospital use: a housing having separable upper and lower portions, said lower portion forming a refuse collector and container; a member sealed in said upper housing portion to form an air-tight partition between said portions; a plurality of fan members mounted on said partition member; a corresponding plurality of apertures in said partition member in communication with said fan members; an inverted frusto-conical filter frame in said lower housing portion, said filter frame having gasket means about its upper edge mounted between said upper and lower housing portions to form an air-tight seal therebetween upon assembly; air inlet means in said lower housing portion adapted to receive a cleaning hose and tool; air discharge means in said upper housing portion arranged to discharge air from the machine in a substantially horizontal direction; means in said lower housing portion adjacent said air inlet means for circumferentially deflecting air entering the machine; a first filtering means of the porosity type comprising a bag-like member formed of impregnated paper, a second filtering means of the porosity type comprising a bag-like member formed of fabric; said second filtering means being positioned inside said first filtering means; said first and second filtering means depending from the top of said lower housing portion into the interior thereof and being partially drawn up into the interior of said filter frame when the machine is in operation; a third filtering means of the inertial impaction type positioned adjacent the upstream side of said partition apertures, said third filtering means including in combination a first and a second dished screen each having an area greater than the combined areas of said partition member apertures, and a first and a second layer of filter material formed of inorganic glass fibers held in contiguous relation between said screens, the fibers of said layers of filter material having a maximum nominal diameter of 1.25 microns; and means for releasably supporting said third filtering means in said upper housing portion including sealing means under pressure to restrict the passage of air into the uper housing portion to that passing through the filtering means.

2. Structure as defined in claim 1 wherein said sealing means includes a clamping ring on one of said screens and releasable fastening means for connecting said clamping ring under pressure to said partition.

3. In a vacuum cleaning machine particularly adapted for hospital use: a housing having separable upper and lower portions, said lower portion forming a refuse collector and container: a member sealed in said upper housing portion to form an air-tight partition between said portions; a fan member mounted on the upper side of said partition member; an aperture in said partition member in communication with said fan member; said partition member having a layer of resilient sealing material on the upper and lower sides thereof; air inlet means in said lower housing portion adapted to receive a cleaning hose and tool; air discharge means in said upper housing portion arranged to discharge air in a substantially horizontal direction; means in said lower housing portion adjacent said air inlet means for circumferentially deflecting air entering the machine; a first filtering means of the porosity type having a bag-like configuration; a second filtering means of the porosity type having a bag-like configuration; said second filtering means being positioned inside said first filtering means; said first and second filtering means depending from the top of said lower housing portion into the interior thereof; an open filter frame formed of rod members extending from the top of said lower housing portion into the interior of said second filtering means; a third filtering means of the inertial impaction type positioned adjacent the upstream side of said partition aperture, said third filtering means including in combination an inner and an outer dished screen, and a plurality of layers of filter material formed of inorganic fibers held in contiguous relation between said screens, the fibers forming said layers of filter material having a maximum nominal diameter of 1.25 microns, said layers of filter material extending outwardly beyond the periphery of said inner screen, said outer screen including a peripheral clamping ring engageable with the outwardly extending portion of said filter material; and releasable fastening means operable to press said clamping ring and filter material into tight engagement with the resilient sealing material on the lower side of said partition around the partition aperture, thereby restricting the passage of air into the upper housing portion to that passing through said layers of filter material.

References Cited in the file of this patent

UNITED STATES PATENTS

| | | |
|---|---|---|
| 2,065,970 | Hartzell | Dec. 29, 1936 |
| 2,156,857 | Kroenlein | May 2, 1939 |
| 2,522,709 | Gerber | Sept. 19, 1950 |
| 2,652,902 | Sheahan | Sept. 22, 1953 |
| 2,656,009 | Kent | Oct. 20, 1953 |
| 2,719,596 | Kent et al. | Oct. 4, 1955 |
| 2,744,443 | Slayter | Dec. 18, 1956 |
| 2,776,726 | Brace | Jan. 8, 1957 |
| 2,785,767 | Glidden | Mar. 19, 1957 |
| 2,789,659 | Hemscheidt | Apr. 23, 1957 |
| 2,882,997 | Smith et al. | Apr. 21, 1959 |